(12) United States Patent
Sugiyama et al.

(10) Patent No.: US 9,439,070 B2
(45) Date of Patent: Sep. 6, 2016

(54) USER AUTHENTICATION SYSTEM (71) Applicant: DeNA Co., Ltd., Tokyo (JP)

(72) Inventors: Toshiharu Sugiyama, Tokyo (JP); Masaaki Yoshikawa, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 0 days.

(21) Appl. No.: 14/689,453

(22) Filed: Apr. 17, 2015

(65) Prior Publication Data
US 2015/0310201 A1  Oct. 29, 2015

(30) Foreign Application Priority Data

Apr. 23, 2014 (JP) ................. 2014-088942

(51) Int. Cl.
| | | |
|---|---|---|
| H04L 29/06 | (2006.01) |
| H04W 12/06 | (2009.01) |
| H04W 12/12 | (2009.01) |
| G06F 21/55 | (2013.01) |

(52) U.S. Cl.
CPC ............ *H04W 12/06* (2013.01); *G06F 21/552* (2013.01); *H04W 12/12* (2013.01); *G06F 2221/2127* (2013.01)

(58) Field of Classification Search
CPC ...... G06F 21/40; G06F 21/44; G06F 21/552; G06F 2221/2127; H04W 12/06; H04W 12/12
USPC .......................................................... 726/7
See application file for complete search history.

(56) References Cited

U.S. PATENT DOCUMENTS

| | | | | |
|---|---|---|---|---|
| 8,312,540 B1 * | 11/2012 | Kahn | ............... | G06F 21/552 713/183 |
| 9,195,834 B1 * | 11/2015 | Jakobsson | ............... | G06F 21/31 |
| 9,210,183 B2 * | 12/2015 | Sadovsky | ............... | G06F 3/0481 |
| 2009/0025084 A1 * | 1/2009 | Siourthas | ............... | G06Q 20/04 726/25 |
| 2009/0063334 A1 * | 3/2009 | Duncan | ............... | G06Q 20/10 705/39 |

(Continued)

FOREIGN PATENT DOCUMENTS

| | | |
|---|---|---|
| JP | S62-099831 A | 5/1987 |
| JP | H10-124457 A | 5/1998 |

(Continued)

OTHER PUBLICATIONS

Japanese Patent Application No. 2014-088942:Decision to Grant mailed on Sep. 2, 2014.

(Continued)

*Primary Examiner* — David García Cervetti
(74) *Attorney, Agent, or Firm* — Procopio, Cory, Hargreaves & Savitch LLP (57) ABSTRACT

A user authentication system 4 includes an authentication processing module 44, which authenticates a user terminal device 1 based on received account identification information and authentication information; a fraud determination module 48, which detects fraud in a login request from the user terminal device 1 based on the access history of the user terminal device 1; and a response control module 46, which allows the user of said user terminal device 1 to log in to a predetermined account if no fraud is detected in the login request and the user terminal device 1 has been authenticated, and, on the other hand, allows the user of said user terminal device 1 to log in to a dummy account in accordance with predetermined criteria if fraud is detected in the login request from the user terminal device 1.

7 Claims, 7 Drawing Sheets

(56) References Cited

U.S. PATENT DOCUMENTS

| | | | | |
|---|---|---|---|---|
| 2009/0083184 | A1* | 3/2009 | Eisen | G06Q 20/10 705/50 |
| 2009/0172033 | A1* | 7/2009 | Clark | G06F 17/3089 |
| 2009/0228780 | A1* | 9/2009 | McGeehan | G06F 21/55 715/234 |
| 2010/0235279 | A1* | 9/2010 | Bouchard | G06Q 20/02 705/44 |
| 2011/0313930 | A1* | 12/2011 | Bailey, Jr. | G06Q 10/10 705/64 |
| 2011/0314559 | A1* | 12/2011 | Jakobsson | G06F 21/36 726/28 |
| 2013/0047210 | A1* | 2/2013 | Rotman | G06F 21/31 726/3 |
| 2013/0091561 | A1* | 4/2013 | Bruso | G06F 21/31 726/16 |
| 2013/0124229 | A1* | 5/2013 | Cashman | G06Q 40/08 705/4 |
| 2013/0125211 | A1* | 5/2013 | Cashman | H04L 63/08 726/4 |
| 2013/0263226 | A1* | 10/2013 | Sudia | H04L 63/1466 726/4 |
| 2014/0282866 | A1* | 9/2014 | Jakobsson | H04L 63/08 726/3 |
| 2015/0180894 | A1* | 6/2015 | Sadovsky | G06F 3/0481 726/22 |
| 2015/0310205 | A1* | 10/2015 | Pruthi | G06F 21/46 726/25 |

FOREIGN PATENT DOCUMENTS

| | | |
|---|---|---|
| JP | 2000-047987 A | 2/2000 |
| JP | 2000-261483 A | 9/2000 |
| JP | 2001-282739 A | 10/2001 |
| JP | 2002-007234 A | 1/2002 |
| JP | 2002-111726 A | 4/2002 |
| JP | 2002-149602 A | 5/2002 |
| JP | 2002-199024 A | 7/2002 |
| JP | 2003-036243 A | 2/2003 |
| JP | 2003-198625 A | 7/2003 |
| JP | 2004-153485 A | 5/2004 |
| JP | 2011-134252 A | 7/2011 |
| JP | 2011-209833 A | 10/2011 |

OTHER PUBLICATIONS

Japanese Patent Application No. 2014-088942:Office Action mailed on Jun. 24, 2014.

* cited by examiner

| User ID | Password | Basic Information | Detailed Information | Dummy Flag | Dummy Account ID | ... |
|---|---|---|---|---|---|---|
| 001 | abcxxx | xxx | xxx | - | ... | ... |
| 002 | bcdxxx | xxx | xxx | - | ... | ... |
| : | : | : | : | : | : | : |
| - | - | xxx | - | × | d001 | ... |
| - | - | xxx | - | × | d002 | ... |
| : | : | : | : | : | : | : |

FIG. 6

| Fraudulent User ID | Fraudulent Password | Dummy Account ID | ... |
|---|---|---|---|
| 005 | efgxxx | d001 | ... |
| 006 | hijxxx | d002 | ... |
| : | : | : | : |

FIG. 7

USER AUTHENTICATION SYSTEM

The present application claims the benefit of Japanese Patent Application No. JP2014-088942, filed on Apr. 23, 2014, the contents of which is incorporated herein in its entirety by reference.

BACKGROUND

1. Technical Field

This invention relates to a user authentication system.

2. Related Art

In the past, well-known methods used to prevent fraudulent login to user accounts registered in a system included WAF (Web Application Firewalls), IDS (Intrusion Detection Systems), IPS (Intrusion Prevention Systems), and so forth. Under these methods, successive attempts to log in to the same user accounts, or trends in terms of login attempts or accessing the system as a whole, were used to detect user terminal devices that made fraudulent login attempts, and access by said user terminal devices was blocked based on information such as IP addresses and the like In addition, Patent Citation 1 describes a user authentication system provided with means for storing data such as images associated with the n-th character of a password for each user ID, and means for reading out data such as images associated with said n-th character and providing the data to a terminal device when the n-th character of the password is correctly entered into the terminal device. Accordingly, with regard to fraudulent activities referred to as phishing scams, in which users' passwords are hijacked using a fake password input screen that mimics a genuine password input screen, it is assumed that users can determine whether or not a password input screen is genuine during password input.

PRIOR-ART CITATIONS

Patent Citations

[Patent Citation 1]

Japanese Patent Application Publication No. 2011-209833.

However, as a result of using a configuration in which access by a user terminal device making a fraudulent login attempt is blocked upon detection of said user terminal device, as was done in the past, the third party making a fraudulent login attempt is alerted to the fact that access has been blocked, in other words, that the fraudulent login has been detected at the system side. In such a case, the third party may examine the fraudulent login detection method, threshold values, and the like used by the system and may make another fraudulent login attempt upon discovering a higher-level attack method that circumvents the fraudulent login detection and the blocking of access by said system. If a high-level attack method is devised in this manner, fraudulent login detection at the system side may become more difficult.

In accordance with the technology described in Patent Citation 1, if none of the password character strings produces a match, authentication failure (NG) processing is performed, and the third party who made the fraudulent login attempt is alerted to the fact that the system has detected a failed login.

SUMMARY

The present invention was devised by considering the above-described circumstances and it is an object of the invention to provide a technology capable of taking defensive measures against fraudulent logins without alerting user terminal devices making fraudulent login attempts to the fact that the fraudulent logins have been detected at the system side.

The present invention provides a user authentication system comprising:

a login receiving module, which receives an account login request from a user terminal device along with account identification information and authentication information;

an authentication processing module, which determines whether or not the combination of the account identification information and the authentication information received by the login receiving module matches a pre-stored combination of predetermined account identification information and authentication information, and, in the event of a match, authenticates said user terminal device;

a fraud determination module, which detects fraud in the login request from the user terminal device based on the access history of the user terminal device; and a response control module, which allows the user of the said user terminal device to log in to the predetermined account if the fraud determination module does not detect fraud in the login request from the user terminal device and the authentication processing module has authenticated the user terminal device, allows the user of said user terminal device to log in to a dummy account in accordance with predetermined criteria if the fraud determination module detects fraud in the login request from the user terminal device and the authentication processing module was unable to authenticate the user terminal device, and does not allow said user terminal device to log in to the predetermined account or the dummy account and delivers an error notification to said user terminal device if the fraud determination module detects fraud in the login request from the user terminal device and the authentication processing module has authenticated the user terminal device.

It should be noted that arbitrary combinations of the constituent elements above, as well as items produced by converting the wording of the present invention into methods, apparatuses, systems, recording media, computer programs (e.g., non-transitory computer readable media having machine-executable instructions with which a computer having a storage and a hardware processor connected via a network to a terminal device operates), and the like, are valid as embodiments of the present invention.

Effects of the Invention

According to the present invention, defensive measures against fraudulent logins can be taken without alerting user terminal devices making fraudulent login attempts to the fact that the fraudulent logins are detected at the system side.

DETAILED DESCRIPTION

An embodiment of the present invention will be described below with reference to drawings. It should be noted that like reference numerals are used to refer to like constituent elements in all the drawings, and descriptions thereof will be omitted as appropriate.

Figure 1:
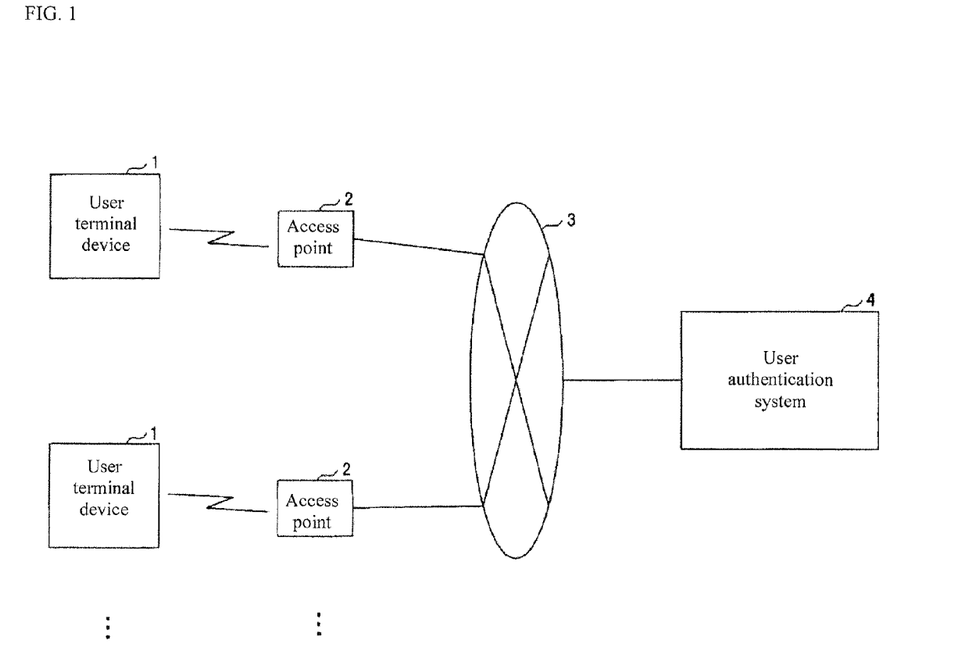
FIG. 1 A block diagram depicting an exemplary network configuration used in the present embodiment.

FIG. 1 is a block diagram depicting an exemplary network configuration used in the present embodiment.

The network configuration includes user-operated user terminal devices 1, access points 2 such as mobile wireless base stations or Wi-Fi stations, and a user authentication system 4 that performs user authentication processing. The user authentication system 4 is connected to multiple user terminal devices 1 over a network 3. The terminal devices 1 are, for example, mobile phones, smartphones, game consoles, personal computers, touch pads, electronic book readers, or other information processing devices.

Figure 2:
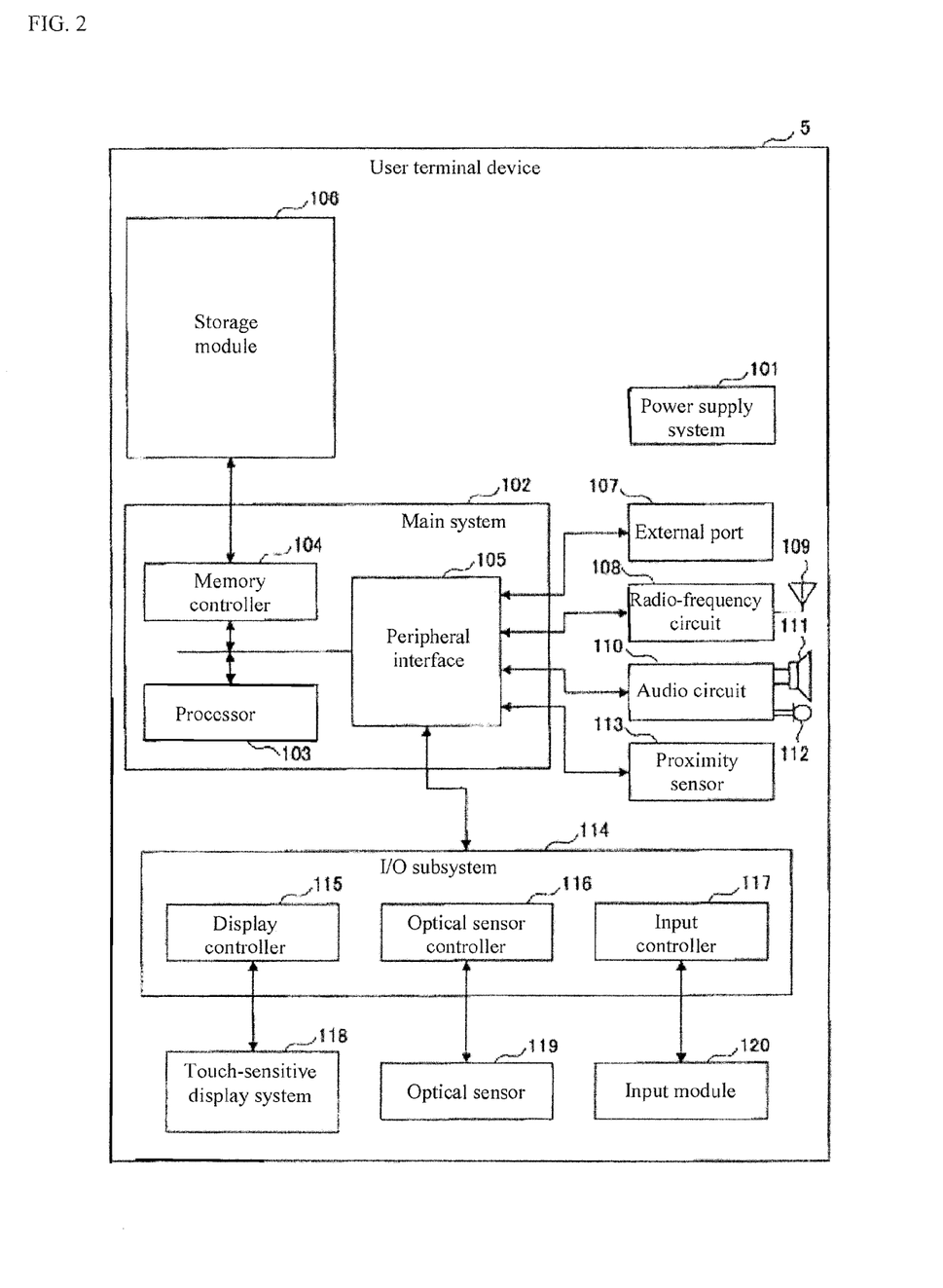
FIG. 2 A block diagram depicting an exemplary hardware configuration of a user terminal device used in the present embodiment.

FIG. 2 is a block diagram depicting an exemplary hardware configuration of a user terminal device 1 used in the present embodiment.

The user terminal device 1 includes a power supply system 101, a main system 102, a storage module 106, an external port 107, a radio-frequency circuit 108, an antenna 109, an audio circuit 110, a speaker 111, a microphone 112, a proximity sensor 113, an I/O subsystem 114, a touch-sensitive display system 118, an optical sensor 119, and an input module 120.

The main system 102 includes a processor 103, a memory controller 104, and a peripheral interface 105. The I/O subsystem 114 includes a display controller 115, an optical sensor controller 116, and an input controller 117.

Figure 3:
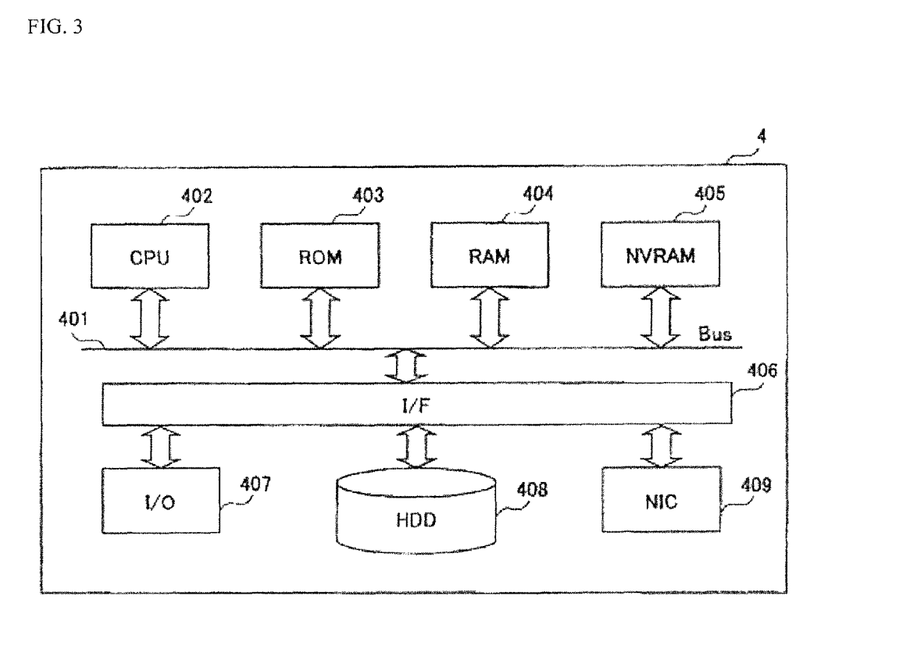
FIG. 3 A block diagram depicting an exemplary hardware configuration of a user authentication system used in the present embodiment.

FIG. 3 is a block diagram depicting an exemplary hardware configuration of a user authentication system 4 used in the present embodiment.

The user authentication system 4 includes a CPU (Central Processing Unit) 402, a ROM (Read Only Memory) 403, a RAM (Random Access Memory) 404, an NVRAM (Non-Volatile Random Access Memory) 405, and an I/F (Interface) 406, which are connected to a system bus 401, as well as a keyboard, a mouse, a monitor, a CD/DVD (Compact Disk/Digital Versatile Disk) drive, and other I/O devices (Input/Output Devices) 407, a HDD (Hard Disk Drive) 408, and an NIC (Network Interface Card) 409, which are connected to the I/F 406. It should be noted that the user terminal device 1 may also have the hardware configuration depicted in FIG. 3.

Figure 4:
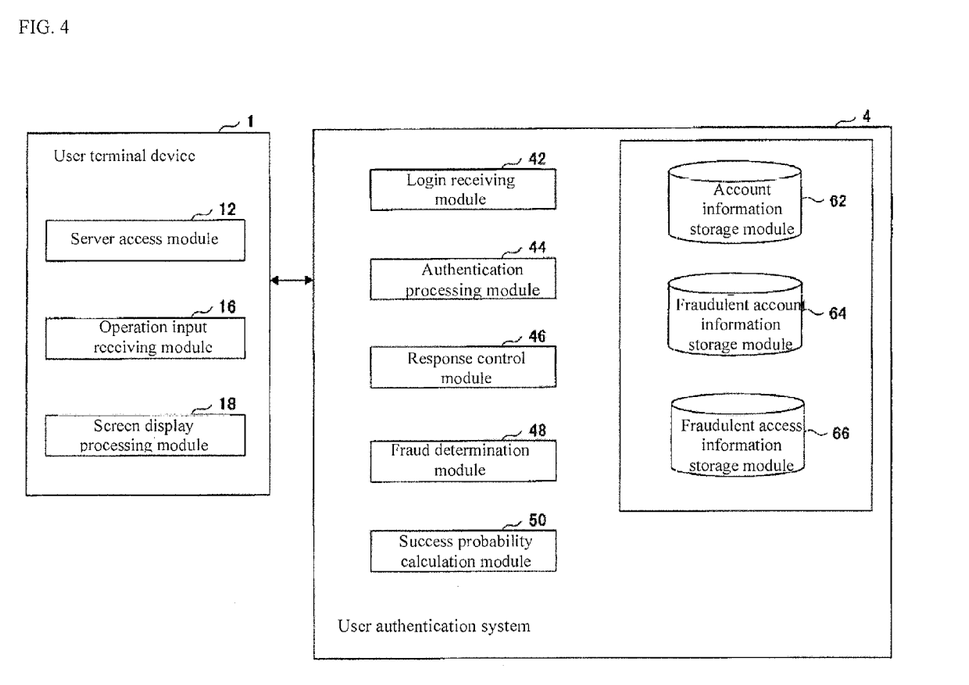
FIG. 4 A block diagram depicting an exemplary functional configuration of the user terminal device and user authentication system used in the present embodiment.

FIG. 4 is a block diagram depicting the functional configuration of the user terminal device 1 and the user authentication system 4.

The user terminal device 1 includes a server access module 12, an operation input receiving module 16, and a screen display processing module 18. The operation input receiving module 16 receives operation input from the user operating the user terminal device 1. The server access module 12 accesses the user authentication system 4, transmits requests to the user authentication system 4, and receives processing results, etc., as a response. The screen display processing module 18 provides an on-screen display.

The user authentication system 4 includes a login receiving module 42, an authentication processing module 44, a response control module 46, a fraud determination module 48, a success probability calculation module 50, an account information storage module 62, a fraudulent account information storage module 64, and a fraudulent access information storage module 66.

The login receiving module 42 receives an account login request from the user terminal device 1 along with account identification information and authentication information. Here, a user ID can be used as the account identification information. In addition, a password can be used as the authentication information. Specifically, the login receiving module 42 receives a user ID and a password along with the login request from the user terminal device 1.

The account information storage module 62 stores account information, such as the user IDs and passwords of the users. The configuration of the account information storage module 62 will be described below.

The authentication processing module 44 determines whether or not the combination of the user ID and password received by the login receiving module 42 matches the combination of the user ID and password of a predetermined account pre-stored in the account information storage module 62 and authenticates the user terminal device 1 in the event of a match.

Here, the password character strings stored in the account information storage module 62 can be hash values, etc., obtained, for example, by applying a predetermined one-way hash function (an MD function). Accordingly, even if information is leaked from the account information storage module 62, the password character strings can be prevented from being used by third parties. In this case, the authentication processing module 44 can obtain a hash value by applying a predetermined one-way hash function to the password received by the login receiving module 42 and determine whether or not the combination of the user ID and password matches by comparing said hash value with the password character strings stored in the account information storage module 62.

The fraud determination module 48 monitors access by the user terminal device 1 and detects fraud in login requests from the user terminal device 1 based on the access history of said user terminal device 1. The fraud determination module 48 monitors not only login requests from each user terminal device 1 to a single account, but also monitors access to the user authentication system 4 by each user terminal device 1. Namely, if there are successive login requests from a user terminal device 1 to multiple accounts, the fraud determination module 48 monitors login requests from said user terminal device 1 to these multiple accounts. An existing fraudulent access detection method can be utilized as the method used by the fraud determination module 48 to detect fraud in login requests. The fraud determination module 48 may use, for example, the fraudulent login detection methods employed in the methods mentioned above: WAF, IDS, IPS, and the like.

The fraud determination module 48 can detect fraud in login requests based on, for example, the number of successive access request attempts from the same IP address, the time interval between the attempts, and so on. Specifically, the fraud determination module 48 determines that a login request is fraudulent if, for example, the frequency of the access requests from the same IP address is higher than a predetermined number, the interval between the access requests from the same IP address is shorter than a predetermined interval, or the variation in the user IDs contained in the access requests from the same IP address is equal to or greater than a predetermined number, and so forth. Furthermore, the fraud determination module 48 can also detect fraud in login requests by, for example, detecting the fact that token translation does not proceed normally if tokens and token translation logic are embedded in the login page.

If the fraud determination module 48 does not detect fraud in the login request from the user terminal device 1 and the authentication processing module 44 has authenticated the user terminal device 1, the response control module 46 allows the user of said user terminal device 1 to log in to the account identified by the user ID received by the login receiving module 42. This procedure is the normal login procedure.

On the other hand, in the present embodiment, the response control module 46 allows the user of the user terminal device 1 to log in to a dummy account in accordance with predetermined criteria if the fraud determination module 48 detects fraud in the login request from said user terminal device 1.

As one example, the phrase "allows to log in to a dummy account" refers to statically generating a dummy user account page, or the like, based on basic user information used for a dummy account prepared in advance, and providing that page to the user terminal device 1. In addition, when the third party making fraudulent login attempts makes a new fraudulent login attempt, basic user information used for the dummy account is automatically generated by a predetermined program (e.g., non-transitory computer readable media having machine-executable instructions with which a computer having a storage and a hardware processor connected via a network to a terminal device operates), and a dummy user account page, or the like, can be dynamically generated based on said basic information and provided to the user terminal device 1. Here, for example, the predetermined program can generate the basic user information used for the dummy account as described below. Personal information, such as a name and so forth, is generated by randomly selecting and combining records from multiple pre-stored dummy data records. In addition, the date of birth, sex, and other values, for which even random numbers are acceptable, are generated in a random fashion. Items containing no personal information, such as avatars or game data and the like, are generated either by extracting arbitrary items from actual user data, or by randomly combining extracted user data.

Figure 5:
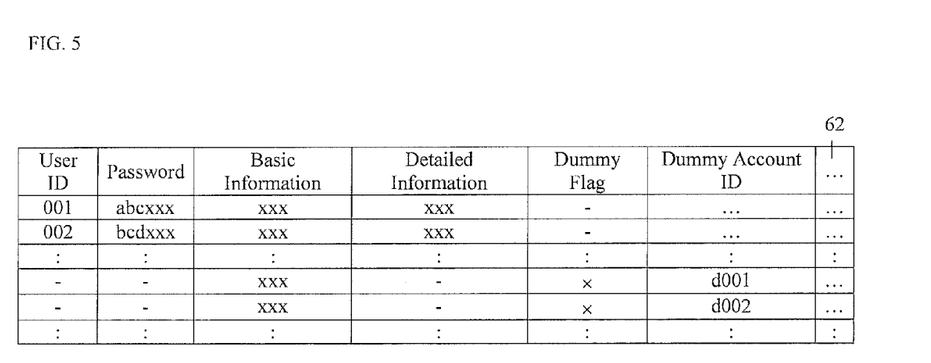
FIG. 5 A diagram depicting an exemplary internal configuration of an account information storage module used in the present embodiment.

FIG. 5 is a diagram depicting an example of the internal configuration of the account information storage module 62 used in the present embodiment. The account information storage module 62 stores records such as "User ID", "Password", "Basic Information", "Detailed Information", and so forth. "User ID", which contains information that uniquely identifies users, also contains information that uniquely identifies the accounts of said users. "Password" contains character strings indicating authentication information for said user IDs.

"Basic Information" can be initial information entered by the users at the time when the accounts are created, for example, a user name and address, and so forth. On the other hand, "Detailed Information" can be information accumulated by users while using the user authentication system 4. For example, if the user authentication system 4 is used for online shopping, "Detailed Information" can contain information such as the purchase histories of said users.

In the present embodiment, the account information storage module 62 may further include items such as "Dummy Flag", "Dummy Account ID", and the like. "Dummy Flag" represents information indicating that said account information relates to a dummy account. "Dummy Account ID" represents information that uniquely identifies said dummy account. However, "Dummy Account ID" is different from a user ID and is used by the user authentication system 4 to identify each dummy account.

A configuration can be used in which a dummy account that has its "Dummy Flag" on (x) does not have user IDs, passwords, or detailed information configured, and only has dummy basic information configured. Commonly used information such as names and addresses can be stored in advance as the "Basic Information" of the dummy account.

If a user is allowed to log in to a dummy account, the response control module 46 uses the "Basic Information" of the dummy account having a "Dummy Flag" on in order to dynamically generate a dummy user account page and provide it to the user terminal device 1. Here, multiple dummy accounts can be stored in the account information storage module 62 and the response control module 46 can freely select a single dummy account from among the multiple dummy accounts and use the "Basic Information" of said dummy account to dynamically generate a dummy user account page and provide it to the user terminal device 1. In addition, if a user ID is displayed on the dummy user account page at such time, the displayed user ID is the one entered via the user terminal device 1.

Below, in order to distinguish dummy and non-dummy information, accounts other than the dummy accounts stored in the account information storage module 62 will be referred to as "valid accounts", and the user IDs and passwords of the valid accounts will be referred to as "valid user IDs and passwords".

In addition, while the example depicted in FIG. 5 illustrates a case in which the account information of the valid accounts and dummy accounts is stored in the account information storage module 62, in other examples, the account information of the dummy accounts may be stored in an area different from the account information storage module 62. In such a case, the account information storage module 62 can use a configuration that does not include items such as "Dummy Flag", "Dummy Account ID", and the like. In addition, as another example, a new user ID may be assigned when a dummy account is created, without distinguishing between user IDs and dummy account IDs.

Referring back to FIG. 4, in the present embodiment, the response control module 46 does not allow the user terminal device 1 to log in to any predetermined accounts or dummy accounts and delivers an error notification to said user terminal device 1 if the authentication processing module 44 has authenticated the user terminal device 1, in other words, if the combination of the user ID and password entered via the user terminal device 1 matches the combination of the user ID and password stored in advance in the account information storage module 62, and if the fraud determination module 48 detects fraud in the login request from the user terminal device 1. The error notification can describe the same kind of login errors as those occurring when there are input errors during ordinary login attempts, such as, for example, "The user ID or password is incorrect". However, in some cases the third party making fraudulent login attempts knows in advance that this is the correct combination of a user ID and a password for said account. In such a case, if a login error is returned, there is a risk that said third party may be alerted to the fact that a fraud detection system is in operation. For this reason, the error notification can also be a communication error, a system error, or the like.

On the other hand, if the authentication processing module 44 has been unable to authenticate the user terminal device 1, in other words, if the combination of the user ID and password entered via the user terminal device 1 does not match the combination of the user ID and password stored in advance in the account information storage module 62, and if the fraud determination module 48 detects fraud in the login request from the user terminal device 1, the response control module 46 allows the user of said user terminal device 1 to log in to a dummy account in accordance with predetermined criteria.

Specifically, if the predetermined criteria are satisfied, the response control module 46 allows the user of the user terminal device 1 to log in to a dummy account, and if the predetermined criteria are not satisfied, an error notification is delivered to said user terminal device 1.

In the present embodiment, the probability of login success, i.e. the probability of authentication of a login request from the user terminal device 1, can be used to determine whether or not the predetermined criteria are satisfied.

The success probability calculation module 50 uses the access history of the user terminal device 1 and the authentication results produced by the authentication processing module 44 to calculate a login success probability, i.e. the probability of authentication of a login request from said user terminal device 1. It should be noted that the success probability calculation module 50 may calculate the login success probability based on the authentication results obtained by the authentication processing module 44 and the access history of said user terminal device 1 after detection of fraud in the login request from the user terminal device 1 by the fraud determination module 48, or, alternatively, may calculate the login success probability using the authentication results obtained by the authentication processing module 44 and the access history of said user terminal device 1 prior to detection of fraud in the login request from the user terminal device 1 by the fraud determination module 48.

If the fraud determination module 48 detects fraud in a login request from the user terminal device 1, the response control module 46 can use a success probability calculated by the success probability calculation module 50 to determine whether or not to allow the user of the user terminal device 1 to log in to a dummy account. If it is decided to allow the user of the terminal device 1 to log in to a dummy account, the response control module 46 can allow the user of said user terminal device 1 to log in to the dummy account.

Here, for example, the success probability calculation module 50 can use the number of login request attempts from the same IP address and the frequency of successful logins to calculate the login success probability for the user terminal device 1 at said IP address.

In addition, if the fraud determination module 48 detects fraud in login requests originating from the user terminal device 1, the response control module 46 can deliver an error notification for a fixed number of fraudulent login requests. The success probability calculation module 50 can detect the frequency of successful logins relative to the login requests issued by said user terminal device 1 while making said fixed number of fraudulent login request attempts, and can use the number of login request attempts and the frequency of successful logins to calculate a login success probability for said user terminal device 1.

In addition, while not illustrated, the user authentication system 4 may include a storage module for storing information that associates fraudulent access types with login success probabilities, and the success probability calculation module 50 can also use the authentication results obtained by the authentication processing module 44 and the access history of the user terminal device 1, for which the fraud determination module 48 has detected fraud in a login request, in order to determine the type of fraudulent access by said user terminal device 1 and acquire the login success probability associated with said type of fraudulent access.

However, even if the success probability calculated by the success probability calculation module 50 is used to determine whether or not to allow the user of the user terminal device 1 to log in to the dummy account, as described above, the response control module 46 does not allow said user terminal device 1 to log in to any of the predetermined accounts and dummy accounts and delivers an error notification to said user terminal device 1 if the combination of the user ID and password entered via the user terminal device 1 matches a valid combination of the user ID and password stored in the account information storage module 62.

Namely, if the fraud determination module 48 detects fraud in a login request from the user terminal device 1, for example, if the success probability calculation module 50 has calculated a success probability of 5%, the response control module 46 delivers an error notification to said user terminal device 1 if the combination of the user ID and password entered via the user terminal device 1 matches a valid combination of the user ID and password stored in the account information storage module 62, and in other cases it issues a login error in 95% of the cases, and permits login to a dummy account in 5% of the cases.

When the response control module 46 allows the user terminal device 1 to log in to a dummy account, the fraudulent account information storage module 64 stores the account identification information and authentication information received from said user terminal device 1 as fraudulent information in association with the dummy account. The response control module 46 allows the user of said user terminal device 1 to log in to the dummy account associated with said fraudulent information if the combination of the account identification information and authentication information received by the login receiving module 42 matches the fraudulent information stored in the fraudulent account information storage module 64.

In the present embodiment, the user of the user terminal device 1 is allowed to log in to a dummy account in order to avoid alerting said user terminal device 1 making the fraudulent login attempt (login fraudster) to the fact that the fraudulent login has been detected at the system side. At such time, the login fraudster who has made a fraudulent login attempt does not realize that he or she has logged into a dummy account and is led to believe that the login has been successful. Subsequently, the login fraudster may, for verification purposes, make a fraudulent login attempt by using the same combination of the user ID and password again. For this reason, in the present embodiment, the combination of the user ID and password entered via the user terminal device 1 when the fraudulent login was detected at the system side is stored in the fraudulent account information storage module 64 for a fixed period of time (e.g., one month, etc.). Subsequently, to conceal the fact that the dummy account is fake, the user terminal device 1 that tries to log in by using the combination of the user ID and password stored in the fraudulent account information storage module 64 is again allowed to log in to the same dummy account.

Figure 6:
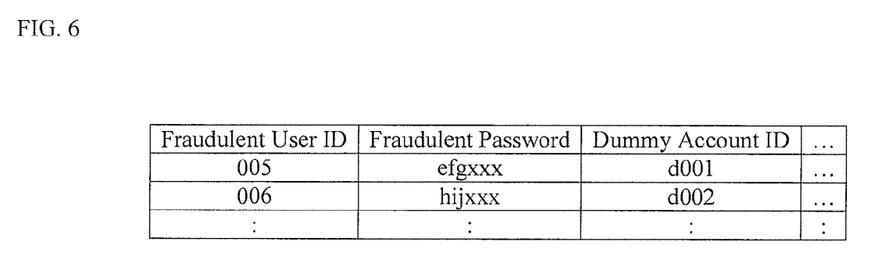
FIG. 6 A diagram depicting an exemplary internal configuration of a fraudulent account information storage module used in the present embodiment.

FIG. 6 is a diagram depicting an exemplary internal configuration of the fraudulent account information storage module 64 used in the present embodiment. In the present embodiment, the fraudulent account information storage module 64 contains items such as "Fraudulent User ID", "Fraudulent Password", "Dummy Account ID", and the like.

"Fraudulent User ID" and "Fraudulent Password" represent the combination of the user ID and password entered via the user terminal device 1 when the fraudulent login was detected at the system side and login to the dummy account was allowed. The "Dummy Account ID" corresponds to the "Dummy Account ID" in the account information storage module 62 illustrated in FIG. 5.

Here, the fraudulent user ID and the fraudulent password were entered by the user terminal device 1 making fraudulent login attempts (login fraudster), and they may constitute an effective combination of the user ID and password in other systems. Accordingly, the character string of the fraudulent password stored in the fraudulent account information storage module 64 can be a hash value, or the like, obtained, for example, by applying a predetermined one-way hash function (MD function).

Additionally, the character string of the fraudulent user ID may also be a hash value, or the like, obtained, for example, by applying a predetermined one-way hash function (MD function).

Referring back to FIG. 4, the fraudulent access information storage module 66 stores information regarding fraudulent logins detected by the fraud determination module 48, information used when the response control module 46 delivers error notifications, and various other types of information related to fraudulent access.

Figure 7:
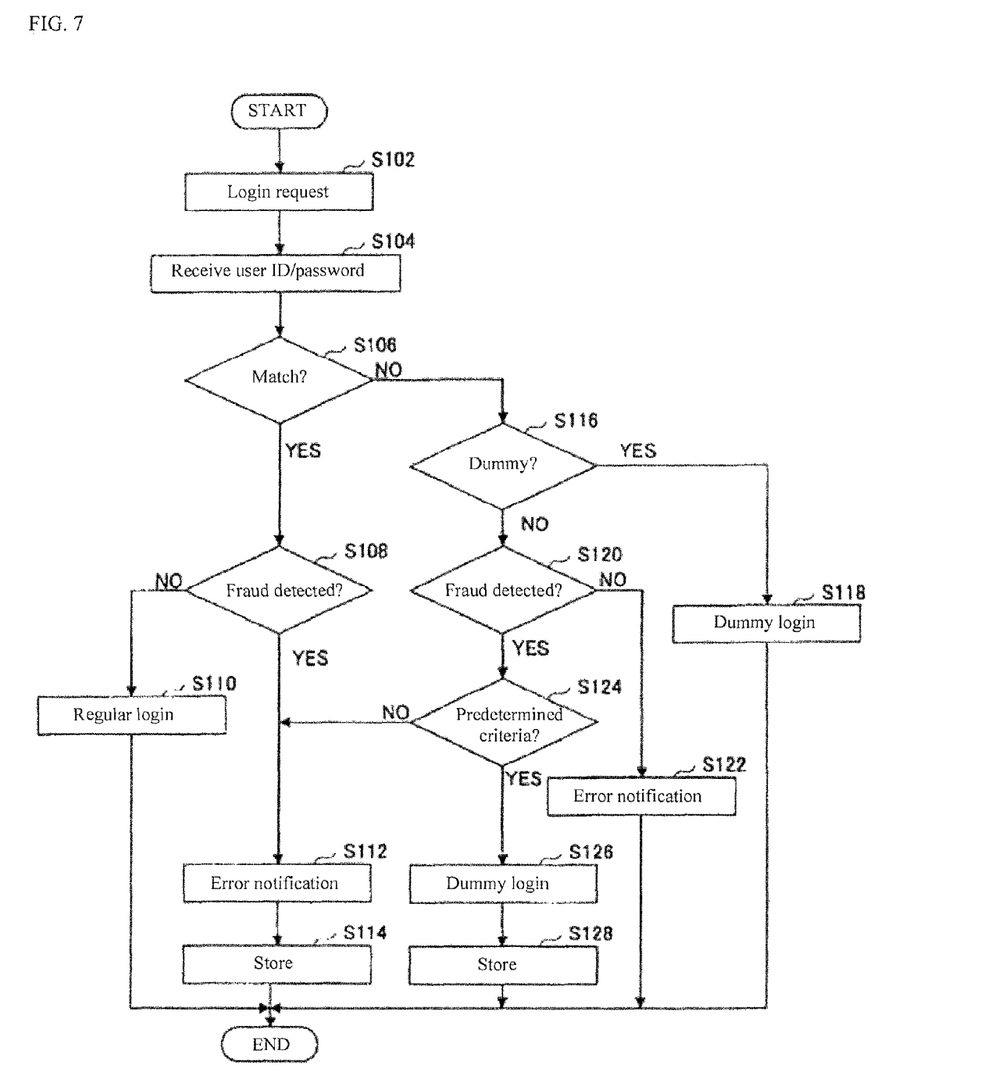
FIG. 7 A flow chart depicting an exemplary processing procedure employed by the user authentication system in a specific example of the present embodiment.

FIG. 7 is a flow chart depicting an example of the processing procedure employed by the user authentication system 4 in the present embodiment.

When the login receiving module 42 receives a request from the user terminal device 1 to log in to an account along with a user ID and a password (Step S102 and Step S104), the authentication processing module 44 determines whether or not said user ID and password combination matches the valid combination of the user ID and password stored in the account information storage module 62 (Step S106). It should be noted that when the user terminal device 1 accesses the user authentication system 4, the fraud determination module 48 monitors access by the user terminal device 1 and detects for fraud in the login request from said user terminal device 1. In addition, at such time, the success probability calculation module 50 can also monitor access by the user terminal device 1 and calculate the probability of successful login by the user terminal device 1. It should be noted that the monitoring of access by the user terminal device 1 may be triggered when the user terminal device 1 fails to log in.

If in Step S106 the combination of the user ID and password matches the valid combination of the user ID and password stored in the account information storage module 62 (YES in Step S106), the response control module 46 determines whether or not the fraud determination module 48 has detected fraud in the login request (Step S108). If the fraud determination module 48 has not detected fraud in the login request (NO in Step S108), then the response control module 46 allows the user of said user terminal device 1 to log in to the predetermined account identified by the user ID (Step S110).

On the other hand, if in Step S108 the fraud determination module 48 has detected fraud in the login request (YES in Step S108), the response control module 46 delivers an error notification to said user terminal device 1 (Step S112) and stores a record of the fraudulent login request in the fraudulent access information storage module 66.

In addition, if in Step S106 the combination of the user ID and password does not match the valid combination of the user ID and password stored in the account information storage module 62 (NO in Step S106), the response control module 46 refers to the fraudulent account information storage module 64 and determines whether or not the combination of the user ID and password matches the fraudulent ID/fraudulent password combination (Step S116). If the combination of the user ID and password matches the fraudulent ID/fraudulent password combination stored in the fraudulent account information storage module 64 (YES in Step S116), the response control module 46 allows the user of said user terminal device 1 to log in to the dummy account associated with said fraudulent ID/fraudulent password combination (Step S118).

In addition, if in Step S116 the combination of the user ID and password does not match the fraudulent ID/fraudulent password combination stored in the fraudulent account information storage module 64 (NO in Step S116), it is determined whether or not the fraud determination module 48 has detected fraud in the login request (Step S120). If the fraud determination module 48 has not detected fraud in the login request (NO in Step S120), then the response control module 46 delivers an error notification to said user terminal device 1 (Step S122).

On the other hand, if in Step S120 the fraud determination module 48 has detected fraud in the login request (YES in Step S120), the response control module 46 determines whether or not the predetermined criteria are satisfied (Step S124). Here, the response control module 46 uses the login success probability calculated by the success probability calculation module 50 to decide whether to allow the user of the user terminal device 1 to log in to the dummy account. If it is decided to allow the user of the terminal device 1 to log in to the dummy account (YES in Step S124), the response control module 46 allows the user of said user terminal device 1 to log in to the dummy account (Step S126). At such time, the combination of the user ID and password entered by the user terminal device 1 and the dummy account ID of the dummy account, the login to which is allowed in Step 126, are stored in the fraudulent account information storage module 64 by the response control module 46 (Step S128).

However, if in Step S124 the predetermined criteria are not satisfied (NO in Step S124), namely, if it is decided not to allow the user terminal device 1 to log in to the dummy account based on the login success probability calculated by the success probability calculation module 50, the response control module 46 delivers an error notification to said user terminal device 1 (Step S112) and stores a record of the fraudulent login request in the fraudulent access information storage module 66 (Step S114).

In accordance with the user authentication system 4 of the present embodiment, the user of the user terminal device 1 who made the fraudulent login attempt (login fraudster) is allowed to log in to a dummy account in accordance with predetermined criteria, which allows for defensive measures against fraudulent logins to be taken without alerting the login fraudster to the fact that the fraudulent login has been detected at the system side. This makes it possible to minimize escalation of the attack methods used by the login fraudster.

In addition, in accordance with the user authentication system 4 of the present embodiment, the login fraudster is allowed to log in to a dummy user account page generated using basic dummy account information automatically generated at the time of the login or basic dummy account information prepared in advance. For this reason, defensive measures against fraudulent logins can be easily taken during normal system operation.

The user authentication system 4 of the present embodiment is particularly effective against reverse brute-force attacks and dictionary attacks, which involve attempts to log in to any available account, rather than attempts to fraudulently log in to a specific account.

It should be noted that the constituent elements of the user terminal device 1 and user authentication system 4 depicted in FIG. 4 represent blocks of functional units rather than a configuration of hardware units. The constituent elements of the user terminal device 1 and the user authentication system 4 are implemented using discretionary combinations of hardware and software, in particular discretionary computer CPUs, memory, software programs (e.g., non-transitory computer readable media having machine-executable instructions with which a computer having a storage and a hardware processor connected via a network to a terminal device operates) loaded into memory that are used to implement the constituent elements of this diagram, hard disks and other storage units storing these software programs, and networking interfaces. In addition, those having skill in the art will appreciate that a variety of methods and apparatuses may be used to implement the invention. In addition, configurations may be used in which the functions performed by the user authentication system 4 are distributed across multiple devices and do not have to be performed by a single device.

While various embodiments of the present invention have been described above with reference to drawings, these embodiments are merely exemplary of the present invention, and various other configurations can be adopted in addition to the ones described above.

In addition, the predetermined criteria used when the response control module 46 allows the user of the user terminal device 1, for which a fraudulent login request has been detected, to log in to the dummy account could also be, for example, that the number of login requests from the user terminal device 1 to a single account is equal to or greater than a predetermined number or that a predetermined time elapses after the fraud determination module 48 determines that the login request from user terminal device 1 is fraudulent.

In addition, before detecting (deciding) that the login request from the user terminal device 1 is fraudulent, the fraud determination module 48 can use the access history of the user terminal device 1 in order to determine the likelihood that the login request from the user terminal device 1 is fraudulent. Namely, fraudulent login detection can have multiple levels set up, such as a level at which it is judged that the likelihood that the login request from the user terminal device 1 is fraudulent is high, a level at which it is detected (decided) that the login request is fraudulent, and the like. A configuration could also be adopted in which the response control module 46 takes the following defensive measures against the user terminal device 1 if the fraud determination module 48 determines that the login request from said user terminal device 1 is very likely fraudulent.

For example, if the fraud determination module 48 determines that the login request from the user terminal device 1 is very likely fraudulent even though the combination of the user ID and password entered via the user terminal device 1 matches a valid combination of the user ID and password stored in the account information storage module 62, the response control module 46 can deliver an error notification to the user terminal device 1 without allowing it to log in to this account. At such time, the response control module 46 can deliver the error notification not as a login error but as a system error or communication error.

EXPLANATION OF THE REFERENCE NUMERALS

1 User terminal device
2 Access point
3 Network
4 User authentication system
12 Server access module
16 Operation input receiving module
18 Screen display processing module
42 Login receiving module
44 Authentication processing module
46 Response control module
48 Fraud determination module
50 Success probability calculation module
62 Account information storage module
64 Fraudulent account information storage module
66 Fraudulent access information storage module

The invention claimed is:

1. A user authentication system managing authentication for a predetermined account and a dummy account corresponding to the predetermined account, the user authentication system comprising:
   a processor; and
   a memory, comprising:
   a login receiving module, which when executed by the processor receives an account login request from a user terminal device along with account identification information and authentication information;
   an authentication processing module, which when executed by the processor determines whether or not the combination of the account identification information and the authentication information received by the login receiving module matches a pre-stored combination of predetermined account identification information and authentication information, and, in the event of a match, authenticates said user terminal device;
   a fraud determination module, which when executed by the processor detects fraud in the login request from the user terminal device based on the access history of the user terminal device; and
   a response control module, which when executed by the processor
      allows the user of the said user terminal device to log in to the predetermined account if the fraud determination module does not detect fraud in the login request from the user terminal device and the authentication processing module has authenticated the user terminal device,
      allows the user of said user terminal device to log in to the dummy account in accordance with predetermined criteria if the fraud determination module detects fraud in the login request from the user terminal device and the authentication processing module was unable to authenticate the user terminal device, and does not allow said user terminal device to log in to the predetermined account or the dummy account and delivers an error notification to said user terminal device if the fraud determination module detects fraud in the login request from the user terminal device and the authentication processing module has authenticated the user terminal device.

2. The user authentication system according to claim 1, wherein the response control module, when executed by the processor, allows the user of the user terminal device to log in to a dummy account if the predetermined criteria are satisfied and, on the other hand, delivers an error notification to said user terminal device if said predetermined criteria are not satisfied if the fraud determination module detects fraud in a login request from the user terminal device and the authentication processing module was unable to authenticate the user terminal device.

3. The user authentication system according to claim 1, wherein said memory further comprises a success probability calculation module which when executed by the processor, in the event of detection of fraud in a login request from the user terminal device by the fraud determination module, uses an access history of the user terminal device and the authentication results obtained by the authentication processing module to calculate the probability of success with which login requests from said user terminal device to a single account are authenticated, and the response control module, in the event of detection of fraud in a login request from the user terminal device by the fraud determination module, uses the probability of success calculated by the success probability calculation module to decide whether or not to allow the user of the user terminal device to log in to the dummy account.

4. The user authentication system according to claim 1, wherein the predetermined criteria are that the number of login requests from the user terminal device to a single account is equal to or greater than a predetermined number or that a predetermined time elapses after the fraud determination module determines that the login request from user terminal device is fraudulent.

5. The user authentication system according to claim 1, wherein the memory further comprises a fraudulent account information storage module, which when executed by the processor, stores the account identification information and the authentication information received from said user terminal device in association with the dummy account as fraudulent information when the response control module allows the user terminal device to log in to the dummy account, and the response control module allows the user of said user terminal device to log in to the dummy account associated with said fraudulent information when the combination of the account identification information and the authentication information received by the login receiving module matches the fraudulent information stored in the fraudulent account information storage module.

6. The user authentication system according to claim 1, wherein the memory further basic user information used for the dummy account, and when the user of said user terminal device is allowed to log in to the dummy account, the response control module generates a dummy user account page from the basic user information used for the dummy account and provides the page to said user terminal device.

7. A non-transitory computer readable medium having machine-executable instructions with which a computer having a storage and a hardware processor connected via a network to a user terminal device, the instructions comprising:

managing authentication for a predetermined account and a dummy account corresponding to the predetermined account, receiving an account login request from the user terminal device along with account identification information and authentication information;

determining whether or not the combination of the account identification information and the authentication information matches a pre-stored combination of predetermined account identification information and authentication information, and, in the event of a match, authenticates said user terminal device;

detecting fraud in the login request from the user terminal device based on the access history of the user terminal device; and conducting response control, the conducting response control comprising:

allowing the user of the said user terminal device to log in to the predetermined account if fraud is not detected in the login request from the user terminal device and the user terminal device is authenticated, allowing the user of said user terminal device to log in to the dummy account in accordance with predetermined criteria if fraud is detected in the login request from the user terminal device and the user terminal device is not authenticated, and not allowing said user terminal device to log in to the predetermined account or the dummy account and delivering an error notification to said user terminal device if fraud is not detected in the login request from the user terminal device and the user terminal device is authenticated.

* * * * *